US005497871A

United States Patent [19]
Ciolkevich

[11] Patent Number: 5,497,871
[45] Date of Patent: Mar. 12, 1996

[54] TIRE SINGULATION SYSTEM

[76] Inventor: John T. Ciolkevich, 4807 Hawkins Rd., Richfield, Ohio 44286

[21] Appl. No.: 208,010

[22] Filed: Mar. 9, 1994

[51] Int. Cl.⁶ ................................................... B65G 47/12
[52] U.S. Cl. ................ 198/443; 198/461.2; 198/455; 198/784
[58] Field of Search ................... 198/396, 409, 198/443, 453, 455, 461, 463.6, 603, 784, 444, 592, 688.1, 699.1, 461.2

[56] References Cited

U.S. PATENT DOCUMENTS

| | | | |
|---|---|---|---|
| 2,699,246 | 1/1955 | Harrison et al. | 198/396 |
| 2,704,592 | 3/1955 | Hoppe | 198/409 |
| 3,184,029 | 5/1965 | Loosli | 198/784 |
| 3,185,286 | 5/1965 | Koplin | 198/603 |
| 3,771,641 | 11/1973 | Jönsson et al. | 198/34 |
| 4,421,222 | 12/1983 | Stuermer | 198/382 |
| 4,526,267 | 7/1985 | Harding et al. | 198/409 |
| 4,855,174 | 8/1989 | Kawamoto | 198/699.1 |
| 4,919,251 | 4/1990 | Downing | 198/463.6 |
| 4,932,513 | 6/1990 | Michimae et al. | 198/397 |
| 5,307,922 | 5/1994 | Ohta et al. | 198/443 |

Primary Examiner—Joseph E. Valenza
Attorney, Agent, or Firm—Renner, Kenner, Greive, Bobak, Taylor & Weber

[57] ABSTRACT

Singulation apparatus (10) for transforming a plurality of randomly oriented tires (T) in an inlet hopper to a linear alignment of tires reposing on their sidewalls including, a singulator assembly (20) having a plurality of stepped conveyor stages (21–24) with tire sidewall engaging surfaces (25–29) which are angularly upwardly inclined, mechanisms (35, 35', 36, 37, 38, 39) for driving the sidewall engaging surfaces of each of the conveyor surfaces at differing linear velocities for unscrambling and spacing tires passing through the singulator assembly, an unloading chute (70) for accumulating tires received from the singulator assembly in laterally aligned relation, a download conveyor (85) for intermittently receiving tires from the unloading chute and depositing the tires in linear alignment on a discharge conveyor (100).

20 Claims, 5 Drawing Sheets 5,497,871

TIRE SINGULATION SYSTEM

TECHNICAL FIELD

The present invention relates generally to conveyor systems. More particularly, the present invention relates to a conveyor system which effects the singulation of a plurality of randomly oriented workpieces to a single-file configuration while transporting the workpieces between two locations. More specifically, the present invention relates to a conveyor system which converts a plurality of workpieces, such as tires or the like, in totally random stacked, shingled, and piled orientations at an input station to a linear, single-level configuration at a discharge station.

BACKGROUND ART

Over the years, the disposition of discarded tires has progressively become a serious environmental problem. With increasing numbers of vehicles being employed worldwide, the number of tires discarded annually has increased correspondingly. The quantity of discarded tires continues to grow despite efforts of tire manufacturers to extend the operating life of tires and efforts of retreaders to retread tires, particularly truck tires, as many times as possible, until such time as the carcass is damaged or worn to such an extent that retreading to produce a safe tire is no longer feasible.

For many years, tires were conventionally discarded into landfills along with other trash. This did not prove to be a satisfactory solution due to the relatively large volume of a tire, the number of discarded tires, and the fact that vulcanized rubber degrades little, if at all, even over time periods of many years. Thus, the disposal of scrap tires by dumping into landfills has been recognized for some years as a long-term unsatisfactory solution.

As a means of limiting the number of discarded tires deposited in landfills, efforts have been made for a number of years to devise commercial usages for discarded tires. In this respect, there have been proposals for the usage of discarded tires as resilient barriers protecting bridge abutments along roadways and other similar applications. Another proposed usage for discarded tires has involved ocean dumping to a create reef-like habitat for fish. These proposed commercial usages, while proving to be operationally feasible, do not make possible the usage of any significant quantities of scrap tires in the context of the many millions of tires which are necessarily discarded on an annual basis.

Efforts have been made for a number of years to effect a thermal decomposition of the rubber in tires for purposes of either reusing the rubber or to make use of the heat output while destroying the tire such that it does not constitute an environmental problem. While significant heat energy as for electrical power generation or other heating applications can be derived from burning tires, there have been problems associated with the burning of tires which involve the handling of certain noncombustible by-products, particularly the steel cord commonly used in tires and slag resulting from the burning process. In recent years, significant strides have been made to provide for handling and disposal of the slag and steel by-products, such that the commercial incineration of tires as a heat source has been proven feasible in a number of industries.

The random orientation of tires as they are loaded into trucks was satisfactory for dumping at landfills. However, the commercial feasibility of burning substantial quantities of tires in furnaces has given rise to a necessity for feeding systems capable of converting a truckload of tires which are dumped in random orientation in a pile to an organized, linear alignment of tires properly oriented to facilitate fast, easy insertion into a furnace, cement kiln, or shredder in a controlled manner. A recent objective has been to develop equipment which will effect automated handling of randomly oriented tires to eliminate the labor-intensive manual handling that would otherwise be involved.

While the reorientation and transport of large quantities of articles such as food patties and the like have been addressed with various mechanized conveyor systems, many of the features are not appropriate for the handling of large, substantially toroidal objects composed primarily of elastomeric materials, as is the case with discarded tires. One approach to the automated singulation of tires from a random stack has employed the disposition of the tires in a water tank, with the use of a water wheel or other water-propelling device to direct the tires to a hook or other pick-up element that is designed to endeavor to grasp tires by the bead area and deposit the tires one at a time onto a discharge conveyor. Such a system presupposes a uniform floatation of different tires, the ability to control the displacement and orientation of the tires by movement of the water in which they are floating, and the ability of a hook to reliably grasp a tire at an appropriate time when, and if, it is positioned for pickup. To applicant's knowledge, such floatation singulation systems have not achieved widespread commercial acceptance.

DISCLOSURE OF THE INVENTION

Therefore, an object of the present invention is to provide a tire singulation system for the fully-automated processing of tires or the like from a totally random orientation to a single-file or linear configuration suitable for introduction into a furnace or for other processing. Another object of the present invention is to provide such a singulation system which is capable of handling tires of somewhat different sizes without the necessity for alterations or adjustments to the system. A further object of the present invention is to provide such a tire singulation system which can be designed to supply tires at a rate of from 2 to 20 per minute, depending upon the size of the system, and in a substantially continuous sequence so long as tires are supplied to the system.

A further object of the present invention is to provide a tire singulation system which affords reliable operation even though tires introduced may be stacked, shingled, or otherwise disposed in any random relative orientation whatsoever. Another object of the present invention is to provide such a singulation system which restrains the delivery of tires to a download conveyor while the download conveyor is transferring singulated tires to a discharge conveyor. Yet another object of the present invention is to provide such a singulation system which can be adapted by simple sizing changes to handle tires of widely different sizes and to achieve desired variations in the through put of tires per time interval.

Still another object of the present invention is to provide a tire singulation system which employs a plurality of stepped conveyor stages that are angularly upwardly inclined and have tire engaging surfaces which are independently powered at different linear velocities to effect optimum unscrambling of the tires. Yet a further object of the present invention is to provide such a singulation system wherein the individual step conveyor stages consist of a plurality of driven rolls, with at least some rolls of the conveyor stages having a different linear velocity at the tire-engaging surface than the other rolls within the same conveyor stage to further enhance the unscrambling and separation of tires within the various conveyor stages.

A further object of the present invention is to provide a tire singulation system which is designed for severe operating conditions, such that it is capable of operating for extended time periods without the necessity for extensive maintenance or overhaul. Yet a further object of the invention is to provide such a singulation system that is adaptable to an automatic control system which is susceptible to the incorporation of sensing devices to signal the introduction of foreign material to the system or an operational defect in the system. Yet another object of the invention is to provide such a tire singulation system which is relatively inexpensive, reliable, and sufficiently non-complex to allow relatively easy maintenance.

At least one or more of the foregoing objects, together with the advantages thereof over known singulation systems for the handling of tires or the like, which shall become apparent from the specification that follows, are accomplished by the invention as hereinafter described and claimed.

In general, the invention contemplates singulation apparatus for transforming a plurality of randomly oriented tires in an inlet hopper to a linear alignment of tires reposing on their sidewalls including, a singulator assembly having a plurality of stepped conveyor stages with tire sidewall engaging surfaces which are angularly upwardly inclined, mechanism for driving the sidewall engaging surfaces of each of the conveyor surfaces at differing linear velocities for unscrambling and spacing tires passing through the singulator assembly, an unloading chute for accumulating tires received from the singulator assembly in laterally aligned relation, a download conveyor for intermittently receiving tires from the unloading chute and depositing the tires in linear alignment on a discharge conveyor.

PREFERRED EMBODIMENT FOR CARRYING OUT THE INVENTION

Figure 1:
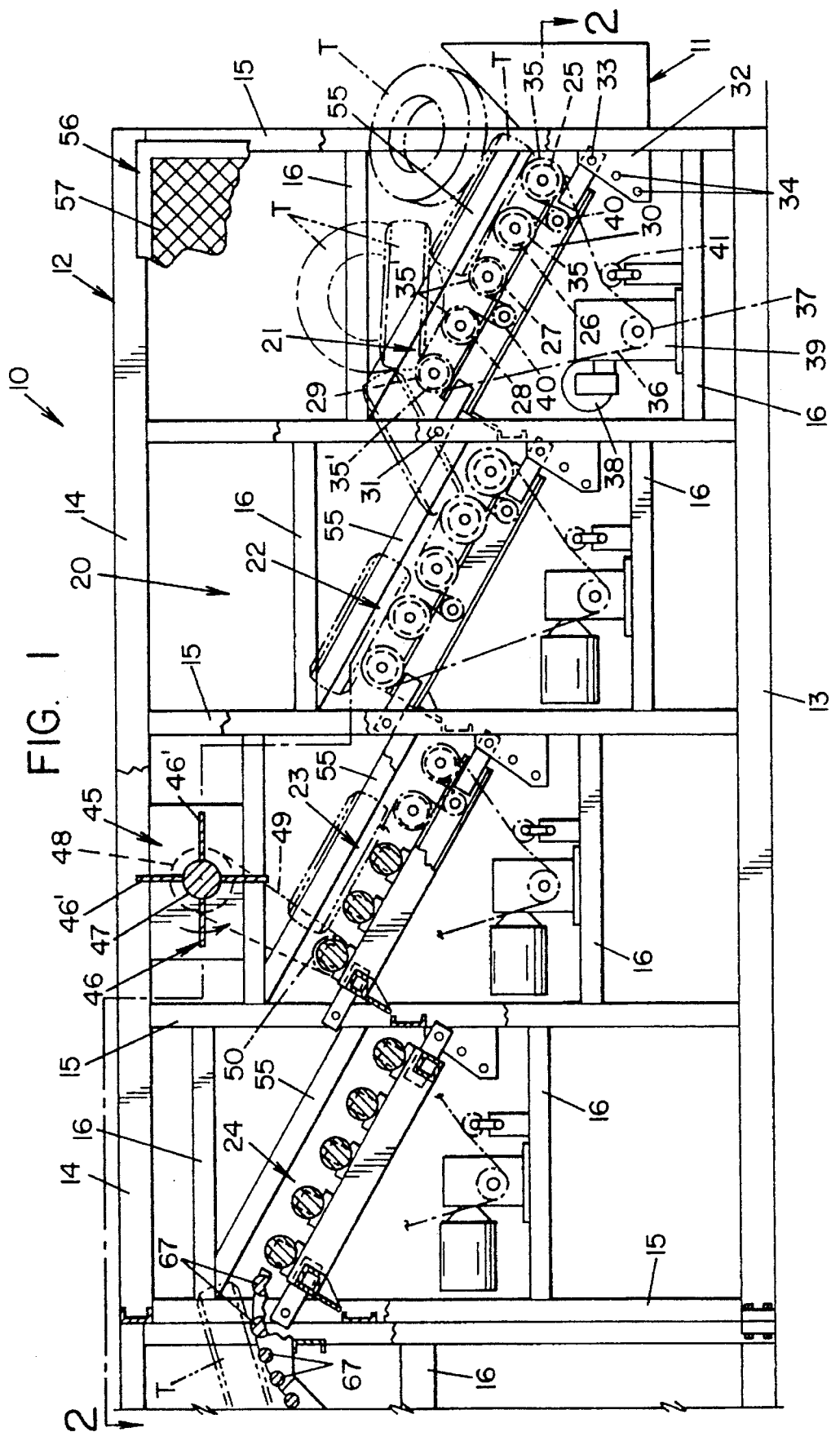
FIG. 1 is a fragmentary, side-elevational view of a tire singulation system according to the concepts of the present invention showing details of the singulator assembly and the feed hopper for introducing tires to the system.
Figure 2:
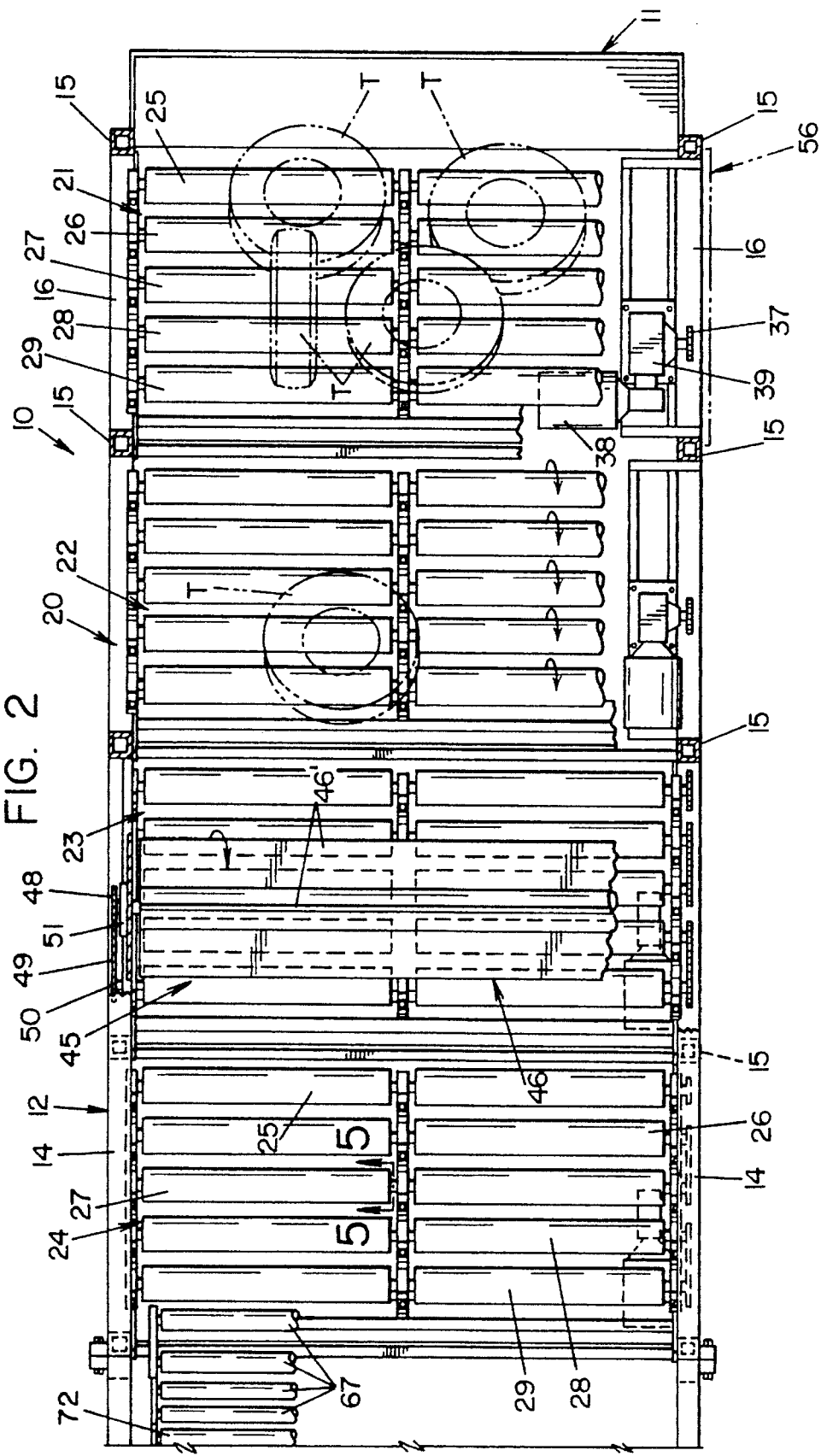
FIG. 2 is a plan view of the singulator assembly and hopper taken substantially along the line 2—2 of FIG. 1 and showing details of the roller arrangements and the drive system therefor.
Figure 3:
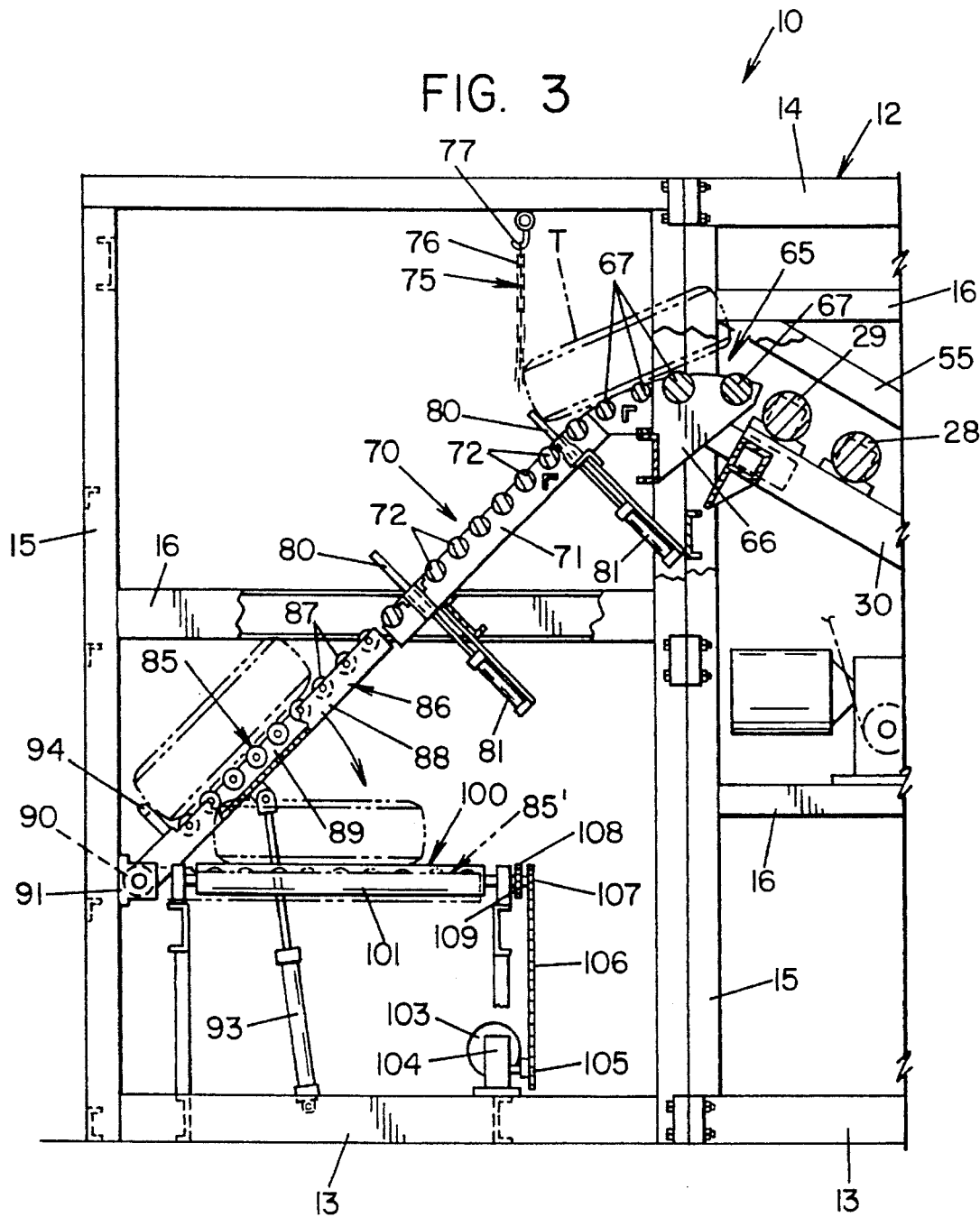
FIG. 3 is a side-elevational view of the unloading chute, download conveyor, and discharge conveyor which receive tires from the singulator assembly and transport tires out of the singulator apparatus in a linear, single-file alignment on a discharge conveyor.

Tire singulation apparatus according to the concepts of the present invention for transforming a plurality of randomly oriented tires to a single row or linear alignment of the tires is generally indicated by the numeral 10 in FIGS. 1 and 3 of the drawings. The randomly oriented tires T are introduced to the tire singulation apparatus 10 by virtue of positioning in a hopper, generally indicated by the numeral 11, which is attached at the inlet to tire singulation apparatus 10. The hopper 11 may be in the form of a substantially rectangular box, as seen in FIGS. 1 and 2, which is upwardly open to receive quantities of tires T which are intermittently deposited therein.

The hopper 11 may be supplied scrap tires T by some type of bulk feeding device, such as a hydraulically-operated walking floor hopper (not shown). The bulk feeder may be adapted to accept randomly oriented tires T from a payloader, a truck, or other source, as will be appreciated by persons skilled in the art. The bulk feeder can be sized to provide an uninterrupted supply of tires T to the hopper 11 for time periods of up to several hours.

The tire singulation apparatus 10 has a generally rectangular framework 12 consisting of bottom and top horizontal beams 13 and 14 which are spaced and joined by a plurality of vertical supports 15. The vertical supports 15 may be stabilized by strategically placed horizontal supports 16. The hopper 11 may be conveniently attached to the vertical supports 15 at one end of the framework 12 and extend outwardly thereof.

Positioned within the framework 12 commencing proximate to the hopper 11 is a singulator assembly, generally indicated by the numeral 20. The singulator assembly 20 is composed of a plurality of identical stages, each consisting of an identical conveyor. As shown, there is a first-stage conveyor, generally indicated by the numeral 21, a second-stage conveyor, generally indicated by the numeral 22, a third-stage conveyor, generally indicated by the numeral 23, and a fourth-stage conveyor, generally indicated by the numeral 24.

As best seen in FIG. 1, each of conveyors is inclined upwardly at an angle of approximately 30° to the horizontal, although this angulation may be varied, and the angulation of each of conveyors 21, 22, 23, 24 need not be the same. It is also to be noted that the input, or right side as viewed in FIG. 1, of conveyors 22, 23, and 24 is preferably spaced a distance vertically below the end or output of the preceding stage conveyors 21, 22, and 23, respectively, so that the tires T fall a distance vertically downwardly when departing from conveyors 21, 22, and 23 and commence travel at the inlet of the succeeding conveyors 22, 23, and 24, respectively. It will, thus, be appreciated that the randomly oriented tires T introduced to the hopper 11 travel consecutively along conveyors 21, 22, 23, and 24 prior to departing from the singulator assembly 20.

Since each of the conveyors 21–24 may be structurally substantially identical, the following discussion details only first-stage conveyor 21. As seen in FIGS. 1 and 2, the conveyor 21 consists of five spaced and parallel rollers 25, 26, 27, 28, and 29 in ascending order from right to left. It will be appreciated by persons skilled in the art that more or less rollers could be employed in the conveyor 21 and that the size and spacing therebetween may be varied as necessary to optimize the support and travel of tires T up the conveyor 21. The rollers 25–29 may all be of uniform diameter or have two or more adjacent rollers of a slightly differing diameter and conventionally mounted on a frame 30 (FIG. 1). The frame 30 has its upper extremity pivotally mounted on a pin 31 which may conveniently be positioned on a vertical support 15 of the framework 12. The other longitudinal extremity of the frame 30 is mounted on a plate 32 by a pin 33. The plate 32 may similarly be attached to a vertical support 15 of framework 12. The plate 32 may have a plurality of bores 34 positioned on an arc of a circle about pivot pin 31 for purposes of variably locating the pin 33 to dispose the frame 30 at any one of a plurality of angular inclinations from approximately 20° to approximately 40°.

One end of each of the rollers 25–29 mounts a sprocket for driving the respective roll. As shown, rollers 25 and 26 mount larger diameter sprockets 35, and rollers 27, 28, and 29 mount smaller diameter sprockets 35'. The sprockets 35, 35' are engaged by a roller chain 36 which is also engaged by a drive sprocket 37 powered by a motor 38 through a reducer 39. Idler pulleys 40 may be provided to suitably direct the roller chain 36 about the sprockets 35, 35'. In addition, a conventional drive tightener 41 may be provided to adjust tension in roller chain 36, particularly when the angular orientation of frame 30 is adjusted.

Due to the differing diameters of the sprockets 35 and 35', it will be appreciated that the linear velocity at the surface of rollers 27, 28, and 29 will exceed the surface velocity of rollers 25 and 26, such that when tires T are in engagement with and propelled by the sprockets 35', they will move at a greater speed and, therefore, advance ahead of tires T being controlled by the sprockets 35, so as to impart increased spacing on the conveyor 21 with respect to tires T traveling therealong. An exemplary speed differential found to produce good operational results employed a linear velocity at the surface of rollers 25 and 26 of approximately 38 feet per second and an linear velocity at the surface of rollers 27, 28, and 29 of approximately 47 feet per second.

Increased unscrambling effects and separation of tires T can be achieved if conveyors 22, 23, and 24 are similarly provided with differential velocity zones as described above in conjunction with the conveyor 21. It is further advantageous that conveyors 22, 23, and 24 have progressively increasing linear velocities between not only the differential speed zones but as between various conveyor stages. For example, with the above indicated differential velocity zones identified for conveyor 21, conveyor 22 might have a first velocity zone of approximately 56 feet per second and a second velocity zone of approximately 68 feet per second; conveyor 23 might have a first velocity zone of approximately 76 feet per second and a second velocity zone of approximately 86 feet per second; conveyor 24 might have a first velocity zone of approximately 94 feet per second and a second velocity zone of approximately 103 feet per second. It is to be appreciated that these velocities may be adjusted as necessary depending upon the number of rolls per conveyor, the diameter of the rolls, the characteristics of tires T being processed, and other considerations. In this respect, it may be advantageous to power the drive sprocket 37 in each of the conveyor stages with a variable speed drive of a compatible type.

Although the conveyors 21–24 are effective in most instances to displace the tires T to repose in a single layer on the conveyor 24, due to the stepped arrangement therebetween and the differential velocity zones, the singulator assembly 20 may be provided with an anti-stacking mechanism, generally indicated by the numeral 45 in FIG. 1. The anti-stacking mechanism 45 consists of a paddle wheel 46 which is mounted on a shaft 47 for rotation therewith. Also attached to the shaft 47 is a sprocket 48 which is driven by a roller chain 49 that is powered by a sprocket 50 on one of the rollers 25–29; however, the roller chain 49 could be separately or independently powered. As shown in FIG. 2, the roller chain 49 is reeved about a sprocket 50, which is attached to and driven by roller 29 of the conveyor 23. The shaft 47 may be mounted on a take-up frame 51 which adjusts tensioning in the roller chain 49 to accommodate differing positioning of frame 30 of conveyor 23. The paddle wheel 46 is positioned a sufficient distance above roller 29 of conveyor 23 to clear a single layer tire T, such that a stacked or shingled tire T passing therebetween is necessarily engaged and displaced by one of the arms 46' of paddle wheel 46 as it is counter-rotated (counterclockwise as viewed in FIG. 1) at an appropriate velocity.

While a plurality of anti-stacking mechanisms 45 might be employed, a single anti-stacking mechanism 45 positioned proximate conveyor 23 has been found to be particularly satisfactory, since most stacking or shingling is eliminated in a tire T passing through conveyors 21 and 22, such that anti-stacking mechanism 45 merely assures that a stacking or shingling condition does not exist. With a following conveyor 24 subsequent to conveyor 23 adequate travel of the tires T is provided such that an extent of separation of the tires T is established, even though anti-stacking mechanism 45 may be necessary to eliminate a stacked or shingled condition of tires T in conveyor 23. Thus, a single layer of laterally and longitudinally spaced tires is necessarily discharged from the conveyor 24 at the extreme left-hand side of FIGS. 1 and 2, as effected by the singulator assembly 20.

The tires T may be laterally restrained proximate the extremities of the rollers 25–29 in each of the conveyors 21–24 by side plates 55, seen in FIG. 1. In addition, each of the conveyors 21–24 may be provided with side doors 56 opening outwardly of the framework 12 to permit access to conveyors 21–24 for servicing or manual manipulation in the event of a jam-up of the tires T. The doors 56 may have a screen or latticework 57 to protect against the lateral escape of tires T while permitting observation of operation of singulator assembly 20.

Figure 5:
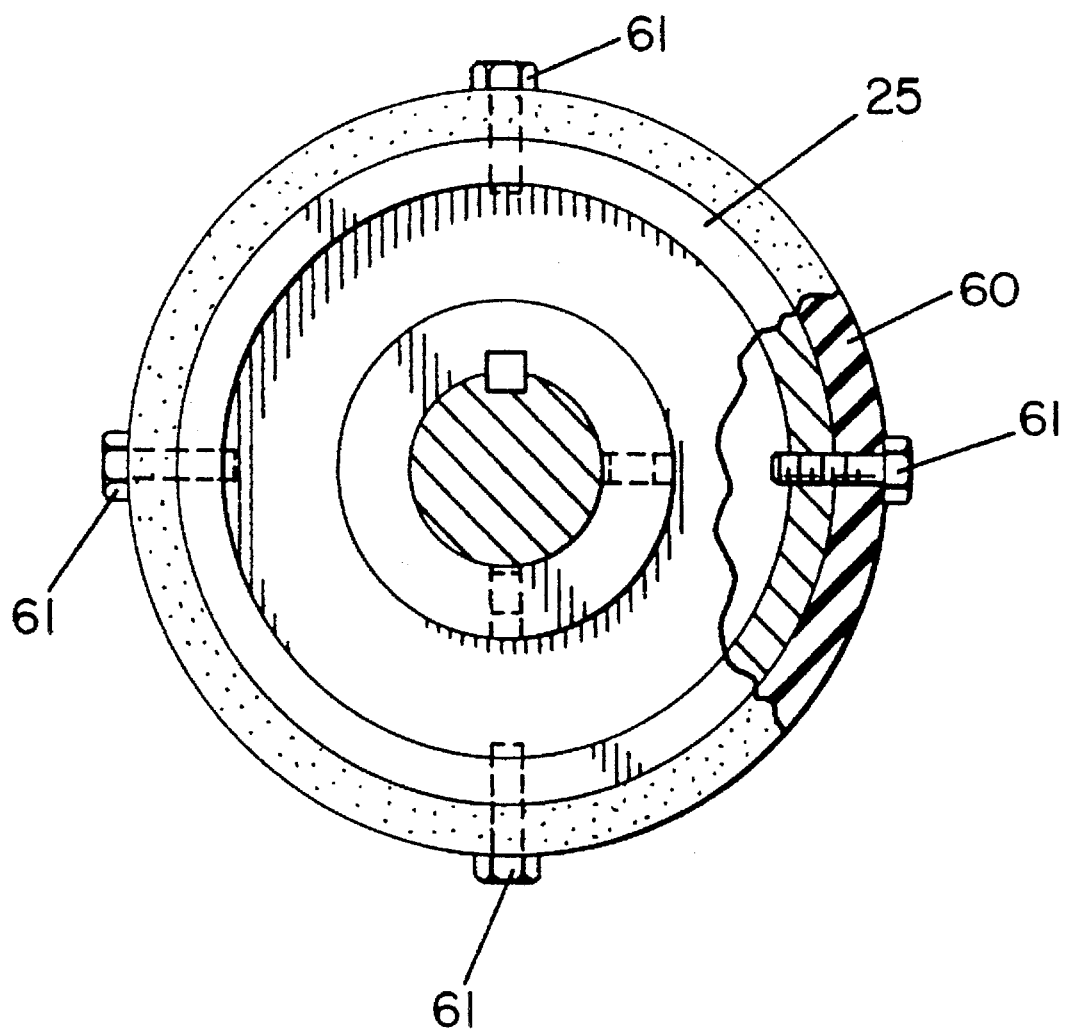
FIG. 5 is a cross-sectional view of a roller of the singulator assembly taken substantially along the line 5—5 of FIG. 2 and depicting the structural elements of an a preferred form of roller.

While the tires T, due to their elastomeric composition, may provide sufficient traction to traverse the rollers 25–29 of the conveyors 21–24 without significant slippage, steps may be taken to assure positive movement of the tires T. Rather than a conventional metallic roller, the rollers 25–29 may be provided with an elastomeric outer cover 60, as depicted in FIGS. 1 and 5. To further enhance positive engagement and movement of tires T, the rollers 25 may have screws 61 positioned about the periphery of the rollers 25–29, with the heads thereof projecting outwardly of the elastomeric outer cover 60. As shown, the screws are positioned at 90° intervals about the circumference of roller 25 and at longitudinal intervals of several inches. It will be appreciated by persons skilled in the art that expedients other than screws 61 may be employed to provide stud-like projections extending from the surface of rollers 25–29 to enhance gripping retention sufficient to substantially positively drive tires T on the inclined surfaces of the conveyors 21–24.

Figure 4:
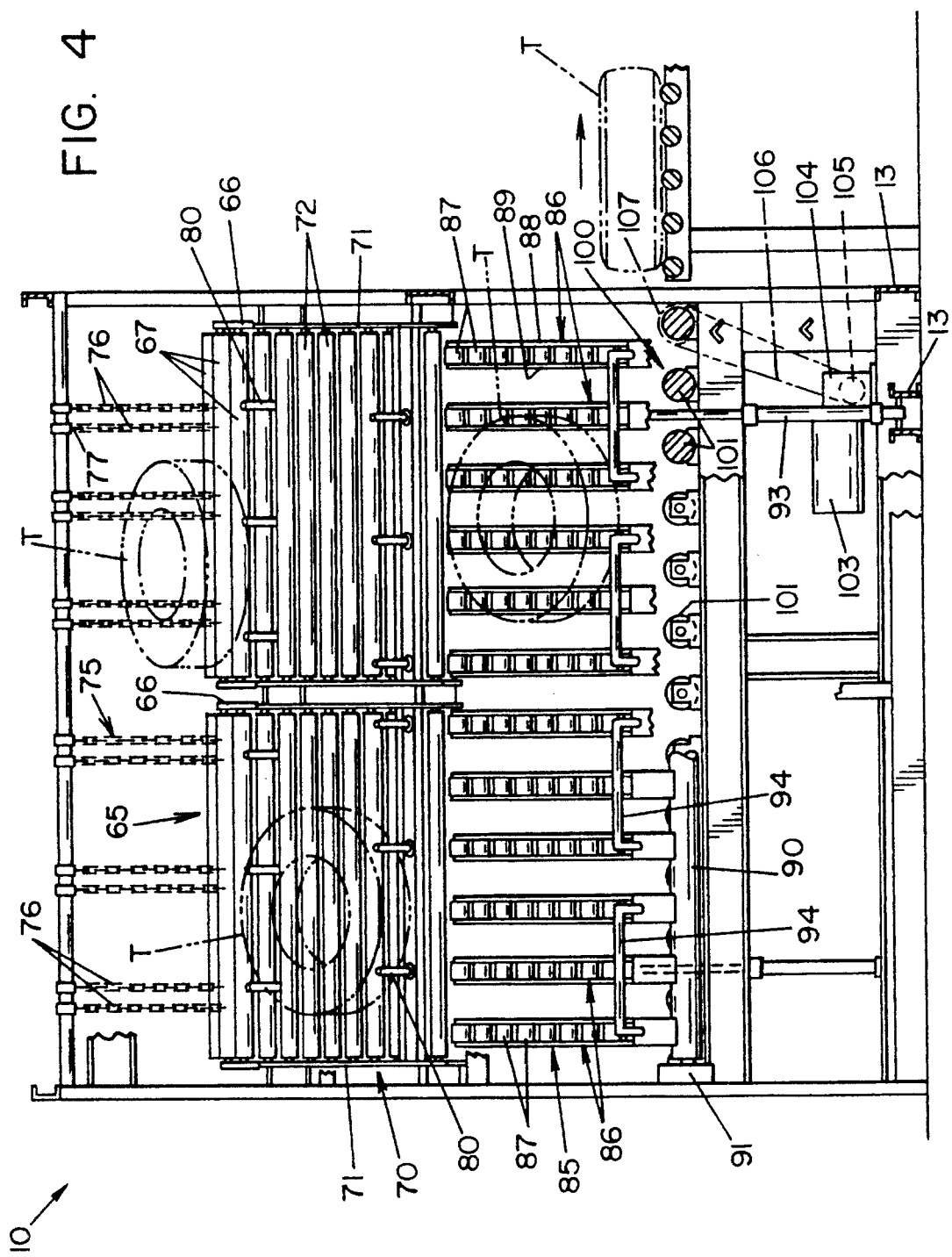
FIG. 4 is an end-elevational view of the unloading chute, download conveyor, and discharge conveyor of FIG. 3 with portions broken away and showing particularly the interfitting relationship between the download conveyor and the discharge conveyor.

The unscrambled, spaced tires discharged from conveyor 24 of the singulator assembly 20 are fed to a transfer section, generally indicated by the numeral 65. As seen in FIGS. 3 and 4, the transfer section 65 has a pair of spaced mounting brackets 66 which carry a plurality of unpowered roller assemblies 67 that are disposed on a curvilinear path defining the apex of travel of the tires T through the tire singulation apparatus 10. As shown, the transfer section 65 consists of four roller assemblies 67 disposed through an arcuate increment of approximately 30°. The roller assemblies 67 serve mainly to change the direction of travel of the tires T from the upward angular inclination of conveyors 21–24 of the singulator assembly 20 to a comparable down angle, based upon the departing velocity from the singulator assembly 20.

Tires T departing the transfer section 65 are delivered onto a downwardly inclined unloader chute, generally indicated by the numeral 70. As seen in FIGS. 3 and 4, the unloader chute 70 consists of a fixed frame 71 having a plurality of unpowered roller assemblies 72 which define a downwardly inclined planar surface. Alternatively, a belt conveyor might be employed in lieu of the roller assemblies 72. As the transfer section 65 has unpowered roller assemblies 67, the relative position, substantially unscrambled and in spaced relation, which exists at the discharge from conveyor 24 is maintained as the tires T enter the unloader chute 70.

If desired, a damping assembly 75 may be positioned in proximity to unloader chute 70 for purposes of quelling any bouncing or hopping of the tires T which might be induced by passage of tires T over transfer section 65. The damping assembly 75 also facilitates tipping of a tire T during departure from the transfer section 65 to stabilize the tires T in the downward orientation of the unloader chute 70. As seen in FIGS. 3 and 4, the damping assembly 75 may consist of a plurality of chains 76 that are suspended from hooks 77 which may be attached to the framework 12. The chains 76 hang down a distance, such that they are above the surface defined by roller assemblies 72 a distance which is somewhat greater than or somewhat less than the sidewall to sidewall dimensions of the tires T so that the chains 76 just clear or slightly engage a tire T passing thereunder. A sufficient number of closely adjacent pairs of the chains 76 are positioned across the width of rollers assemblies 72, such that tires T will necessarily pass under at least one or a selected number of the chains 76 of damping assembly 75.

The unloader chute 70 also serves intermittently as a holding section for tires T for a purpose to be described hereinafter. For this purpose, the unloader chute 70 is provided with a plurality of stop pins 80 which selectively project above the upper surface of the roller assemblies 72. As shown, the stop pins 80 are disposed in two lateral rows between spaced pairs of roller assemblies proximate the top and bottom of unloader chute 70. Stop pins 80 are laterally spaced a distance less than the diameter of any tires T to be processed, such that tires T cannot proceed beyond the upper row or lower row of stop pins 80 when in the extended position depicted in FIGS. 3 and 4 of the drawings. When not effecting a holding function, the stop pins 80 are retracted below the upper surface of the roller assemblies 72. The stop pins 80 are attached to cylinders 81 attached to frame 71 which effect the extension and retraction thereof. A control system for the tire singulation apparatus 10 effects timely actuation of the cylinders 81 in conjunction with the operating sequence of other assemblies of the tire singulation apparatus 10, as described hereinafter.

The tires T released from unloader chute 70 are gravity deposited on a download conveyor, generally indicated by the numeral 85. The download conveyor 85 consists of a plurality of parallel strip conveyors 86, which define a planar surface for receiving tires T. Six strip conveyors 86 are depicted in the right half of the download conveyor 85 in FIG. 4. Each of the strip conveyors 86 consist of a plurality of roller assemblies 87 of short lateral duration which are mounted between side plates 88 and 89. The roller assemblies 87 are not powered, such that the strip conveyors 86 operate as a type of gravity conveyor for the tires T as a result of the angular inclination of download conveyor 85, as seen in FIG. 3. The strip conveyors 86 are cantilevered from a frame 90 pivotally mounted on a pillow block 91 attached to vertical support 15 of the framework 12. The download conveyor 85 is movable between the solid-line position depicted in FIG. 3 and a horizontal orientation depicted in chain lines as 85' in FIG. 3 by a hydraulic cylinder 93. As seen in FIG. 3, the cylinder 93 has its rod end attached to the underside of a strip conveyor 86 and the blind end attached to bottom beam 13 of framework 12.

The frame 90 also mounts a stop rail 94 which engages the tread portion of tires T released by the unloader chute 70 for travel down the strip conveyors 86 of download conveyor 85. When the download conveyor 85 is moved to the horizontal position 85', the strip conveyors 86 intermesh or interfit with a discharge conveyor, generally indicated by the numeral 100. The discharge conveyor 100 consists of a plurality of roller assemblies 101 mounted on framework 12 and spaced a sufficient distance such that a strip conveyor 86 can be interposed between each adjacent pair of the roller assemblies 101. The tires T positioned on the download conveyor 85 are transferred to the roller assemblies 101 of discharge conveyor 100 when download conveyor 85 reaches its horizontal position 85'. The roller assemblies 101 are driven by a motor 103, a gear reducer 104, and a drive sprocket 105 having a roller chain 106 which engages a driven sprocket 107 on one of the roller assemblies 101. Each of the roller assemblies 101 carries a sprocket 108, which sprockets 108 are joined by a roller chain 109. It, thus, will be appreciated that motor 103 simultaneously drives all of the roller assemblies 101, such that the tires T deposited thereon by the download conveyor 85 are driven laterally of download conveyor 85, which is to the right in the depiction of FIG. 4.

When the download conveyor 85 moves from the angular position depicted in FIG. 3, the stop pins 80 remain extended to preclude the release of additional tires T from the unloader chute 70. Once the tires T deposited upon discharge conveyor 100 are all displaced outwardly of the download conveyor 85, the cylinder 93 is actuated to return the download conveyor 85 from the horizontal position 85' to the angular, solid-line position depicted in FIG. 3. At that time, the lower row of stop pins 80 are retracted to permit the tires T located between the lower row of stop pins 80 and the upper row of stop pins 80, to be displaced downwardly by gravity downwardly onto strip conveyors 86 until they move into engagement with the stop rail 94. Thereafter, the sequence repeats, with the cylinder 93 being actuated to lower the download conveyor 85 for transfer to the discharge conveyor 100. During the movement of the download conveyor 85, the lower row of stop pins 80 are extended, and the upper row of stop pins 80 are retracted to permit the gravity movement of tires T detained by the upper row of stop pins 80 to be gravity displaced into engagement with the lower row of stop pins 80. The upper row of stop pins 80 are then extended to detain a further row of tires T supplied from the singulator assembly 20 via the transfer section 65.

Thus, it should be evident that the tire singulation apparatus 10 for transforming a plurality of randomly oriented tires T to a linear alignment of tires T on a discharge conveyor 100 carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. Singulation apparatus for unstacking and unscrambling a plurality of randomly oriented tires in an inlet hopper to form a single layer of tires reposing on their sidewalls comprising, a plurality of conveyor stages with substantially planar tire sidewall engaging surfaces which are angularly upwardly inclined in the direction of travel of the tires and discontinuous, means mounting said conveyor stages with said tire sidewall engaging surface input of succeeding of said conveyor stages being spaced a distance vertically below the output of the preceding of said conveyor stages, whereby the tires fall a distance between conveyor stages, and means for driving said tire engaging surfaces of each of said conveyor stages at differing linear velocities, at least one of said conveyor stages having means for producing differing linear velocities of said sidewall engaging surfaces within said one of said conveyor stages by a plurality of rollers and a powered drive chain engaging sprockets attached to each of said rollers, some of said sprockets being of a larger diameter than other of said sprockets.

2. Singulation apparatus according to claim 1, wherein said tire sidewall engaging surfaces are adjustably angularly positionable from an angle of approximately 20° to an angle of approximately 40°.

3. Singulation apparatus for unstacking and unscrambling a plurality of randomly oriented tires in an inlet hopper to form a single layer of tires reposing on their sidewalls comprising, a plurality of conveyor stages with substantially planar tire sidewall engaging surfaces which are angularly upwardly inclined in the direction of travel of the tires and discontinuous, means mounting said conveyor stages with said tire sidewall engaging surface input of succeeding of said conveyor stages being spaced a distance vertically below the output of the preceding of said conveyor stages, whereby the tires fall a distance between conveyor stages, and means for driving said tire engaging surfaces of each of said conveyor stages at differing linear velocities, said tire sidewall engaging surfaces of said conveyor stages being adjustably angularly positionable as defined by a plurality of rollers mounted on a frame having one end pivotally mounted and the other end adjustably located by a pin positioned in one of a plurality of holes on an arc of a circle about the pivotal mounting of said one end.

4. Singulation apparatus according to claim 1, wherein said singulator assembly means includes anti-stacking means for engaging stacked or shingled tires and producing a single layer of tires departing from said conveyor stages.

5. Singulation apparatus according to claim 4, wherein said anti-stacking means includes a counter-rotating paddle wheel having arms positioned above a conveyor stage a sufficient distance to clear single layer tires passing therebetween.

6. Singulation apparatus for unstacking and unscrambling a plurality of randomly oriented tires in an inlet hopper to form a single layer of tires reposing on their sidewalls comprising, a plurality of conveyor stages with substantially planar tire sidewall engaging surfaces which are angularly upwardly inclined in the direction of travel of the tires and discontinuous, means mounting said conveyor stages with said tire sidewall engaging surface input of succeeding of said conveyor stages being spaced a distance vertically below the output of the preceding of said conveyor stages, whereby the tires fall a distance between conveyor stages, and means for driving said tire engaging surfaces of each of said conveyor stages at differing linear velocities, said tire sidewall engaging surfaces consisting of a plurality of rollers defining a planar surface, said rollers having an elastomeric outer cover with projections extending therefrom for gripping retention of tires positioned thereon.

7. Singulation apparatus for transforming a plurality of randomly oriented tires in an inlet hopper to a linear alignment of tires reposing on their sidewalls comprising, singulator assembly means having a plurality of stepped conveyor stages with tire sidewall engaging surfaces which are angularly upwardly inclined, means for driving said sidewall engaging surfaces of each of said conveyor surfaces at differing linear velocities for unscrambling and spacing tires passing through said singulator assembly, unloading chute means for accumulating tires received from said singulator assembly means in laterally aligned relation, transfer section means interposed between said singulator assembly means and unloading chute means and having a plurality of roller assemblies disposed on a curvilinear path to change the direction of travel of tires from an upward angular inclination to a downward angular inclination, and download conveyor means for intermittently receiving tires from said unloading chute means and depositing the tires in the linear alignment on a discharge conveyor.

8. Singulation apparatus for transforming a plurality of randomly oriented tires in an inlet hopper to a linear alignment of tires reposing on their sidewalks comprising, singulator assembly means having a plurality of stepped conveyor stages with tire sidewall engaging surfaces which are angularly upwardly inclined, means for driving said sidewall engaging surfaces of each of said conveyor surfaces at differing linear velocities for unscrambling and spacing tires passing through said singulator assembly, unloading chute means for accumulating tires received from said singulator assembly means in laterally aligned relation, and download conveyor means for intermittently receiving tires from said unloading chute means and depositing the tires in the linear alignment on a discharge conveyor, said unloading chute means having a plurality of rollers forming a planar surface and including stop pin means selectively extended above and retracted below said planar surface for intermittently serving as a holding section for tires.

9. Singulation apparatus according to claim 8, wherein said stop pin means are arranged in two vertically spaced rows extending laterally of said rollers.

10. Singulation apparatus according to claim 9, wherein said stop pins are operated by cylinders attached to a frame supporting said rollers.

11. Singulation apparatus according to claim 9, wherein said unloading chute means includes a plurality of rollers forming a planar surface and damping means positioned a distance therefrom for quelling any bouncing or hopping of tires introduced to said rollers.

12. Singulation apparatus according to claim 11, wherein said damping means includes suspended chains hanging downwardly in proximity to but spaced from said planar surface.

13. Singulation apparatus for transforming a plurality of randomly oriented tires in an inlet hopper to a linear alignment of tires reposing on their sidewalls comprising, singulator assembly means having a plurality of stepped conveyor stages with tire sidewall engaging surfaces which are angularly upwardly inclined, means for driving said sidewall engaging surfaces of each of said conveyor surfaces at differing linear velocities for unscrambling and spacing tires passing through said singulator assembly, unloading chute means for accumulating tires received from said singulator assembly means in laterally aligned relation, and download conveyor means for intermittently receiving tires from said unloading chute means and depositing the tires in the linear alignment on a discharge conveyor, said download conveyor consisting of a plurality of parallel strip conveyors which define a planar surface for receiving tires.

14. Singulation apparatus according to claim 13, wherein said strip conveyors are attached to a frame mounted for pivotal movement between a position for receiving tires from said unloading chute means to a position for depositing the tires on said discharge conveyor.

15. Singulation apparatus according to claim 14, wherein said frame is pivotally mounted on a pillow block and actuated by a cylinder.

16. Singulation apparatus according to claim 14, wherein said frame mounts a stop rail which engages tires received from said unloading chute means.

17. Singulation apparatus according to claim 3, wherein said singulator assembly means includes anti-stacking means for engaging stacked or shingled tires and producing a single layer of tires departing from said conveyor stages.

18. Singulation apparatus according to claim 17, wherein said anti-stacking means includes a counter-rotating paddle wheel having arms positioned above a conveyor stage a sufficient distance to clear single layer tires passing therebetween.

19. Singulation apparatus according to claim 6, wherein said singulator assembly means includes anti-stacking means for engaging stacked or shingled tires and producing a single layer of tires departing from said conveyor stages.

20. Singulation apparatus according to claim 19, wherein said anti-stacking means includes a counter-rotating paddle wheel having arms positioned above a conveyor stage a sufficient distance to clear single layer tires passing therebetween.

* * * * *